United States Patent [19]
Barber et al.

[11] Patent Number: 6,047,240
[45] Date of Patent: Apr. 4, 2000

[54] METHOD AND APPARATUS FOR EVALUATING THE RESISTIVITY OF INVADED FORMATIONS AT HIGH APPARENT DIP ANGLE

[75] Inventors: Thomas D. Barber; Zlatko Sijercic, both of Houston; Gerald Minerbo, Missouri City; Tracy E. Broussard, Sugar Land, all of Tex.

[73] Assignee: Schlumberger Technology Corporation, Houston, Tex.

[21] Appl. No.: 09/008,040

[22] Filed: Jan. 16, 1998

[51] Int. Cl.⁷ ..................................................... G06F 19/00
[52] U.S. Cl. .............................................................. 702/10
[58] Field of Search ........................... 702/7, 10; 324/338, 324/339

[56] References Cited

U.S. PATENT DOCUMENTS

| | | |
|---|---|---|
| 5,142,472 | 8/1992 | Day . |
| 5,157,605 | 10/1992 | Chandler et al. ............................ 702/7 |
| 5,184,079 | 2/1993 | Barber . |
| 5,187,661 | 2/1993 | Sinclair ........................................ 702/7 |
| 5,210,691 | 5/1993 | Freedman, et al. . |
| 5,355,088 | 10/1994 | Howard, Jr. . |
| 5,388,044 | 2/1995 | Hepp ........................................... 702/10 |
| 5,469,062 | 11/1995 | Meyer, Jr. . |
| 5,506,769 | 4/1996 | Fu et al. . |

*Primary Examiner*—Donald E. McElheny, Jr.
*Attorney, Agent, or Firm*—John J. Ryberg; Brigitte L. Jeffery; Victor H. Segura

[57] ABSTRACT

The present invention relates generally to a method and apparatus for evaluating the resistivity of invaded formations at high apparent dip angle. A multi-array induction tool having a plurality of arrays is disposed in a borehole. Signals from a subset of coils of the array are selected to probe different volumes of the formation surrounding the borehole. The maximum entropy method is used to process data from the subset of coils to effectively remove distortions produced by shoulder and dip effect in the presence of shallow, moderate, or deep invasion. An advantage of the invention is a computer program that accurately predicts the response of induction arrays in an assumed layered formation with dip. After processing the data, the resulting multi-array induction log will indicate a conductivity profile for the subset of coils which is substantially identical to that of an array in a thick bed, without dip or layering, with the same invasion profile. A 1D radial inversion of the resulting logs at each point in depth will give a closer estimate of the actual formation parameters, $R_{xo}$, $R_t$, and the invasion radius.

32 Claims, 9 Drawing Sheets

METHOD AND APPARATUS FOR EVALUATING THE RESISTIVITY OF INVADED FORMATIONS AT HIGH APPARENT DIP ANGLE

BACKGROUND OF THE INVENTION

The present invention relates generally to a method and apparatus for evaluating the resistivity of a borehole using a multi-array induction sonde, and more particularly, to a method and apparatus for evaluating the resistivity of invaded formations at high apparent dip angle.

It is important to the oil and gas industry to know the nature and characteristics of the various sub-surface formations penetrated by a borehole because the mere creation of the borehole usually does not provide sufficient information concerning the existence, depth location, quantity, etc., of oil and gas trapped in the formations. One commonly used tool is the induction logging sonde. Induction devices employ alternating currents in transmitter coils to set up an alternating magnetic field in the surrounding conductive formation. This changing magnetic field induces current loops in the formation that are detectable by a receiver coil in the induction sonde. The voltage detected at the receiver coil will vary inversely with the resistivity of the formation. U.S. Pat. Nos. 3,340,464; 3,147,429; 3,179,879; 3,056,917; and 4,472,684 are illustrative of typical prior art well logging devices which utilize the basic principles of induction logging.

The maximum entropy method has been utilized in the well logging industry to obtain inversions of instrumentally blurred and noisy data. U.S. Pat. No. 5,210,691 issued to Freedman et al., the disclosure of which is incorporated by reference into this specification, describes a maximum entropy method for inverting induction log data. The method involves setting up a series of thin earth layers and solving for the conductivity of each layer that closely produces the observed logs. The reconstructed thin layer sequence can be shown to be a close approximation to the actual formation. The maximum entropy method improves the resolution and accuracy of the estimated resistivity of the uninvaded virgin zone, $R_t$. This method is exact only when there is no invasion of drilling fluids into the formation. The maximum entropy method inversion results in resistivities which are different from $R_t$ in the presence of invasion. A quasi-Newton algorithm based on a maximum entropy method Lagrangian functional has been applied to invert induction log data in dipping beds. See Gerald N. Minerbo, *Inversion of Induction Logs in Dipping Beds,* 1989 PROCEEDINGS FROM THE PROGRESS IN ELECTROMAGNETIC RESEARCH SYMPOSIUM 293–294. However, this algorithm is exact only when there is no invasion of drilling fluids into the dipping beds.

Evaluation of induction logs in highly deviated wells or in formations with high dip angle is complicated by the large volume of investigation of the induction logging tool. FIG. 1 shows in the vertical segment the focusing developed for vertical wells which concentrates the response within the layers (A). Referring to FIG. 2, when the hole is deviated, or when the beds dip with respect to the borehole, the focused response includes layers (B). FIG. 3 shows a computed multi-array induction log in a formation. The log on the right is computed at zero dip or deviation, showing excellent focusing using prior art processing techniques. The log on the left is computed at 70° dip. As suggested by FIG. 2, the high dip angle log shows a blending of adjacent layers. The effect of dip on the induction log makes beds appear thicker, thin beds are more affected than thick beds, and resistive beds are more affected than conductive beds. The resistivity measurement is a blending of the adjacent layers.

U.S. Pat. No. 5,184,079 issued to Thomas D. Barber, the disclosure of which is incorporated by reference into this specification, is directed to a method and apparatus for eliminating the effects of apparent dip introduced in the induction log. Barber describes a dip correction algorithm, adapted to be used in association with a well logging truck computer which produces an induction log, for correcting an error introduced in the induction log by dip effect by means of inverse filters which are computed using log response functions derived from simple dipping formation models. The dip correction algorithm is exact only when there is no invasion of drilling fluids into the formation. None of the heretofore known methods which evaluate the resistivity of a formation also evaluate the resistivity of invaded formations at high apparent dip angle.

SUMMARY OF THE INVENTION

The above disadvantages of the prior art are overcome by means of the subject invention. The method for evaluating the resistivity of invaded formations at high apparent dip angle utilizing a multi-array induction tool having a plurality of arrays disposed in a borehole comprises the steps of selecting a subset of arrays from the plurality of arrays, obtaining voltage signal data from the subset of arrays, and repeatedly determining an initial estimate of the conductivity profile of the formation from the obtained data. Model voltages associated with each of the initial estimates of the conductivity profile are determined. The initial estimates of the conductivity profile are updated to produce a plurality of updated conductivity profiles using the respective incremental values of the model voltages. The plurality of updated conductivity profiles are compared with the respective plurality of initial estimates of the conductivity profiles and tested to determine whether one of the plurality of updated conductivity profiles satisfies a convergence test criteria. The desired updated conductivity profile is recorded and an estimate of the formation parameters $R_{xo}$, $R_t$, and the invasion radius are determined.

An alternate method for evaluating the resistivity of invaded formations at high apparent dip angle utilizing a multi-array induction tool having a plurality of arrays disposed in a borehole comprises the steps of determining an apparent dip angle representing an angle between a longitudinal axis of the borehole and an axis perpendicular to the bedding planes, selecting a subset of arrays from the plurality of arrays, and obtaining voltage signal data from the subset of arrays. The data for the subset of arrays is converted to True Bed Thickness (TBT) format and processed to remove the geometric distortion. The converted data for the subset of arrays is processed with two filters h(a1) and h(a2) where h(a1) is a function of one of the two nearest defined dip angles and filter h(a2) is a function of the other of the two nearest defined dip angles to produce two formation parameters, sigma$_F$(a1) and sigma$_F$(a2), associated with a formation traversed by a borehole at the nearest defined dip angles. By interpolating, a value for sigma$_F$ is determined based on the two nearest defined dip angles, the two formation parameters sigma$_F$(a1) and sigma$_F$(a2), and the apparent dip angle. An estimate of the formation parameters $R_{xo}$, $R_t$, and the invasion radius are determined.

BRIEF DESCRIPTION OF THE DRAWINGS

The advantages of the present invention will become apparent from the following description of the accompanying drawings. It is to be understood that the drawings are to be used for the purpose of illustration only, and not as a definition of the invention.

In the drawings.

DETAILED DESCRIPTION OF THE PREFERRED EMBODIMENT

Figure 4:
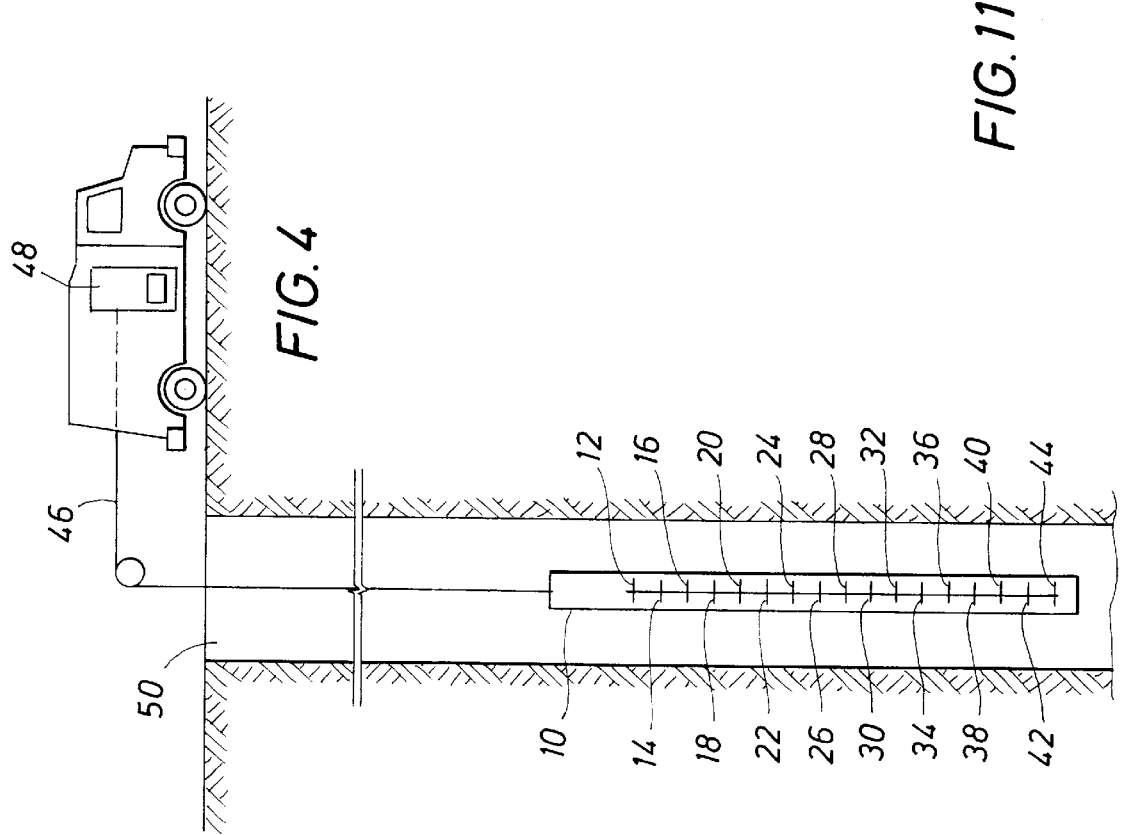
FIG. 4 depicts a multi-array induction tool connected to a processing system.

Referring to FIG. 4, an induction logging system is illustrated. The system includes an induction sonde 10 disposed in an earth formation traversed by a borehole 50 and connected via a wireline 46 to a processing system 48 disposed at the borehole surface for processing signals transmitted uphole by the induction sonde 10. The induction sonde 10 includes a sensor array comprising a transmitter coil 24 disposed in the center, a plurality of bucking coils and receiver coils disposed on one side of the transmitter coil 24, and a further plurality of bucking coils and receiver coils disposed on the other side of the transmitter coil 24. For example, as illustrated in FIG. 4, the following bucking coils and receiver coils exist on a first side of the transmitter coil 24: the 6 inch bucking coil 26, the 6 inch receiving coil 28, the 12 inch bucking coil 30, the 12 inch receiver coil 32, the 21 inch bucking coil 34, the 21 inch receiver coil 36, the 39 inch bucking coil 38, the 39 inch receiver coil 40, the 72 inch bucking coil 42, and the 72 inch receiver coil 44. In addition, the following bucking coils and receiver coils exist on the other side of the transmitter coil 24: the 9 inch bucking coil 22, the 9 inch receiver coil 20, the 15 inch bucking coil 18, the 15 inch receiving coil 16, the 27 inch bucking coil 14, and the 27 inch receiver coil 12. The reference to inches refers to the distance between the transmitter coil and the receiver coil. However, since each particular receiver coil has a corresponding bucking coil for canceling out the mutual inductance between the transmitter coil and the particular receiver coil, the distance identifier for the receiver coil is also retained for its corresponding bucking coil. This sensor array is adequately described in U.S. Pat. No. 5,157,605 issued to Chandler et al., the disclosure of which is incorporated by reference into this specification.

In a preferred embodiment of the invention, signals from a subset of coils 12, 16, 20, 28, 32, 36, 40, and 44 of the array are selected to probe different volumes of the formation surrounding the borehole. The method of the subject invention uses the maximum entropy method described in U.S. Pat. No. 5,210,691 to process data from the subset of coils to effectively remove distortions produced by shoulder and dip effect in the presence of shallow, moderate, or deep invasion (shoulder effect is the response of the induction arrays to formation beds above and below the zone of interest). After processing the data, the resulting multi-array induction log will indicate a conductivity profile for the subset of coils which is substantially identical to that of an array in a thick bed, without dip or layering, with the same invasion profile. The subject invention presents an advantageous means for determining the radial depth of investigation of the subset of coils. Laboratory simulations indicate that the subset of coils has an equivalent depth of investigation of the deeper array within the subset. For example, if the subset of coils consists of the 12 inch, 21 inch, and 27 inch coils, the resulting depth of investigation of the subset is equal to that of the 27 inch array.

To apply the maximum entropy method to induction log inversion, a Lagrangian functional $\mathcal{L}\{\sigma(z)\}$ is constructed of the formation conductivity. A standard Lagrangian functional used in maximum entropy method inversion applications can be written in the form, $$\mathcal{L}\{\sigma(z)\} = -\alpha S\{\sigma(z)\} + \chi^2\{\sigma(z)\} + \beta \int_{-\infty}^{\infty} dz \left(\frac{d\ln\sigma(z)}{dz}\right)^2, \quad (1)$$

where $\alpha \geq 0$ and $\beta \geq 0$ are adjustable parameters. An exponential transformation, $$\sigma(z) = \pi \exp(q(z)), \quad (2)$$

is applied to the functional $\mathcal{L}$. The minimization of the transformed functional is done with respect to $q(z)$. The transformed logarithmic smoothing term can be expressed as a quadratic form ($\vec{q}|H\vec{q}$). The functional derivatives of $\mathcal{L}$ with respect to $\sigma(z)$ and $q(z)$ are simply related, i.e., $$\frac{\delta \mathcal{L}}{\delta q(z)} = \frac{\delta \mathcal{L}}{\delta \sigma(z)} \sigma(z). \quad (3)$$

A stationary point of the transformed functional $\mathcal{L}$ is obtained by setting each individual term in the functional derivative to zero. This leads to an overdetermined system of nonlinear equations. At each iteration, the equations are linearized using a quasi-Newton method so that a system of linear equations in the deviations $\Delta q_l^n \equiv q_l^{n+1} - q_l^n$ is obtained. Here, $q_l^n$ is the value of the function $q(z)$ in the l-th pixel at the n-th iteration. The functional derivatives of the entropy and logarithmic smoothing terms are linear in the deviations $\Delta q_l^n$ because of the transformation in Eq. 2. That is, at the (n+1)-th iteration, setting the derivatives to zero results in linear equations of the form, $$\frac{\alpha}{T}\Delta q_l^n + \frac{\alpha}{T}q_l^n = 0, \quad (4)$$

from the entropy and $$\beta \sum_{m=1}^{N} H_{lm} \Delta q_m^n + \beta \sum_{m=1}^{N} H_{lm} q_m^n = 0, \tag{5}$$

from the logarithmic smoothing term. In the above equations, the index l=1, . . . , N where N is the number of unknowns. The factors α and β should not be canceled since they represent weighting factors in the least squares solution of the overdetermined system of equations. The resulting equations are linearized at each iteration by making a Taylor's series expansion, i.e., $$\tilde{V}_k^j \{q^{(n+1)}\} = \tilde{V}_k^j \{q^n\} + \sum_{m=1}^{N} \frac{\partial \tilde{V}_k^j}{\partial \sigma_m^n} \Delta q_m^n \sigma_m^n. \tag{6}$$

A system of linearized equations for the j-th array can be written in the form, $$\sum_{m=1}^{N} A_{lm}^j \Delta q_m^n = B_l^j, \tag{7}$$

where $$B_l^j = \sum_k \left[ W_{j,R} \mathrm{Re}\left(\frac{\partial \tilde{V}_k^j}{\partial \sigma_l^n}\right) \mathrm{Re}\left(V_k^j - \tilde{V}_k^j\right) + W_{j,X} \mathrm{Im}\left(\frac{\partial \tilde{V}_k^j}{\partial \sigma_l^n}\right) \mathrm{Im}\left(V_k^j - \tilde{V}_k^j\right) \right], \tag{8}$$

and $$A_{lm}^j = \sum_k \left[ W_{j,R} \mathrm{Re}\left(\frac{\partial \tilde{V}_k^j}{\partial \sigma_l^n}\right) \mathrm{Re}\left(\frac{\partial \tilde{V}_k^j}{\partial \sigma_m^n}\right) + W_{j,X} \mathrm{Im}\left(\frac{\partial \tilde{V}_k^j}{\partial \sigma_l^n}\right) \mathrm{Im}\left(\frac{\partial \tilde{V}_k^j}{\partial \sigma_m^n}\right) \right] \sigma_m^n. \tag{9}$$

Note, the summations over the index k in Eqs. 8 and 9 are in the data space whereas in Eqs. 5 and 7, the index m is in the solution space. The derivatives in Eqs. 8 and 9 can be approximated. The linear system of overdetermined equations defined by Eqs. 4–5 and Eq. 7 is solved for the deviations $\Delta q_l^n$ at each iteration using a least squares band solver. Using Eq. 2, the formation conductivity at each iteration is obtained, i.e., $$\sigma_l^{n+1} = \sigma_l^n \exp(\Delta q_l^n). \tag{10}$$

Figure 5:
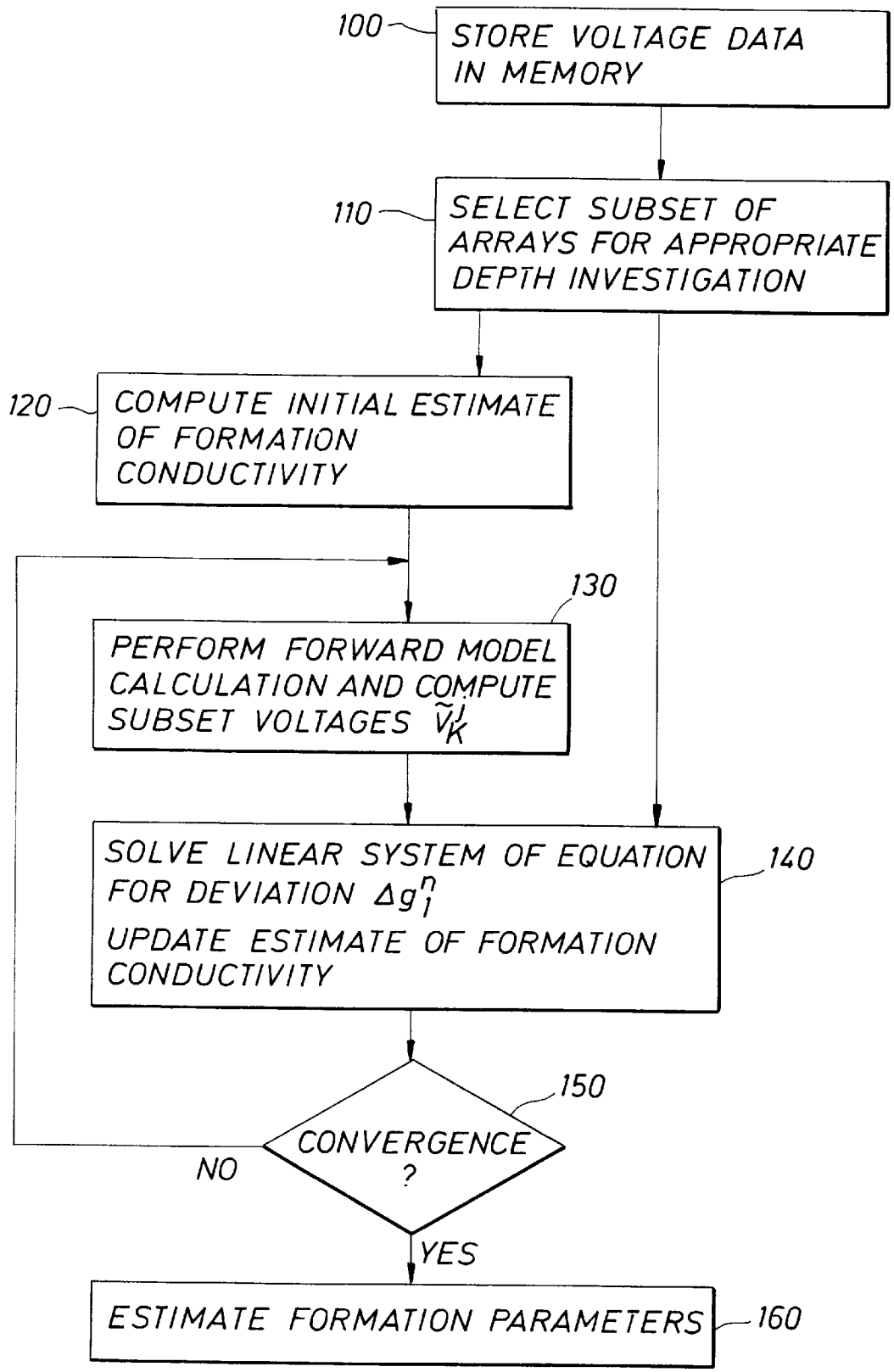
FIG. 5 is a flow chart illustrating a maximum entropy method for evaluating the resistivity of invaded formations at high apparent dip angle.

Referring to FIG. 5, a flowchart of the method for evaluating the resistivity of invaded formations at high apparent dip angle is illustrated. At step 100, the data for the voltages $V_k^j$ recorded by the sonde 10 are stored in the memory of processing system 48. At step 110, a subset of arrays from the multi-array induction sonde 10 are selected to identify the conductivity profile. The subset of arrays comprises any combination of two or more arrays. The combination provides better thin bed resolution and depth of investigation than processing each array singly.

During the initialization phase, step 120, the voltages $V_k^j$ for the subset of arrays are examined and an initial estimate of the formation conductivity profile $\sigma_l^1$ is produced. The forward model calculation is performed at step 130. The model into which the logs are inverted consists of a series of thin formation layers of identical thickness, e.g., 3 inches or 6 inches. The layer thickness is defined in a direction perpendicular to the bedding planes. The estimate $\sigma_l^n$ of the conductivity profile is input to the forward model calculation and the model outputs computed subset voltages $\tilde{V}_k^j$. At step 140, $A_{lm}^j$, matrix elements at the n-th iteration in the quasi-Newton algorithm defined in Eqs. 7 and 9, are calculated. Also, $B_l^j$, vector at the n-th iteration in the quasi-Newton algorithm defined in Eqs. 7 and 8, is calculated. Further, at step 140, the linear system of overdetermined equations defined by Eqs. 4–5 and Eq. 7 are solved for the deviations $\Delta q_l^n$ at each iteration. The updated conductivity profile, $\sigma_l^{n+1}$, is then computed according to Eq. 10 from the estimate of the conductivity profile $\sigma_l^n$ and the deviation $\Delta q_l^n$. After determining the updated conductivity profile, a convergence test is performed at step 150 to ascertain whether $|\sigma_l^{n+1} - \sigma_l^n|/\sigma_l^n << \epsilon$, where ε is a very small number. If this condition is not true, another iteration begins by incrementing n by 1, saving $\sigma_l^{n+1}$, and returning to step 130. On the other hand, if this condition is true, at step 160, an estimate of the formation parameters at the depth of investigation and the deeper of the array pairs are determined. By processing a subset of arrays, with a 1D maximum entropy inversion, the distortions produced by dip and shoulder bed can be effectively removed. Further, by processing a subset of arrays, the conductivity profile $\sigma_l^{n+1}$ is substantially identical to that of the subset of arrays in a thick bed with the same invasion profile.

Because of lower high-frequency content of the deep arrays, the inverted deep array data will have a different vertical resolution than the inverted shallow array data In a preferred embodiment of the invention, the inverted subset array data are matched vertically in resolution by extracting the high-frequency information from the shallow array data present in the subset of arrays and adding this to low-pass filtered information from the deep array data present in the subset of arrays. A depth of investigation different from that of the raw arrays can be derived by means disclosed in U.S. Pat. No. 5,157,605 by weighting the filtered data to refocus the data radially.

Figure 1:
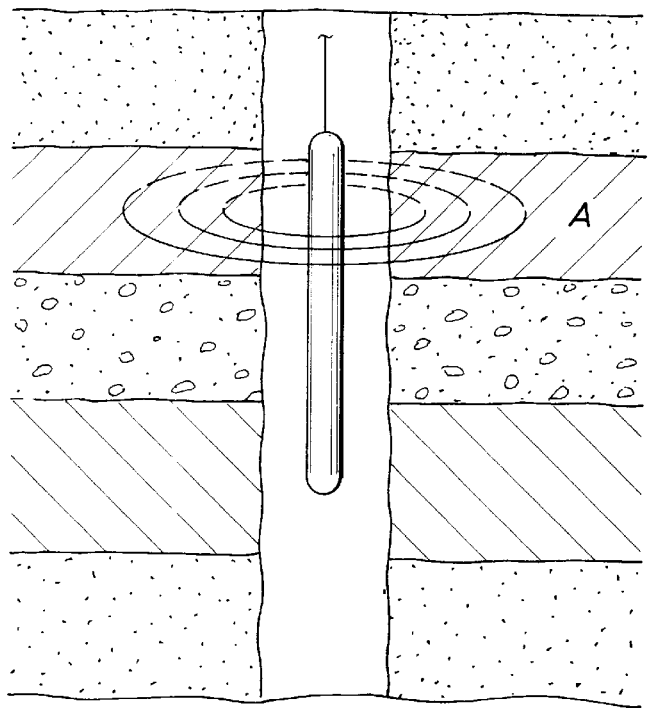
FIG. 1 illustrates formation current density at zero dip.
Figure 2:
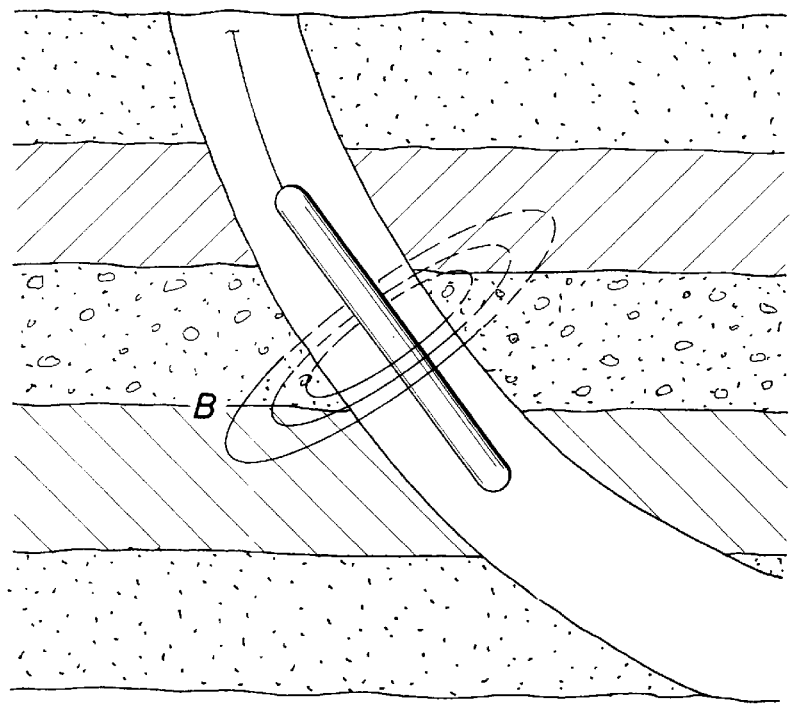
FIG. 2 illustrates formation current density crossing bed boundaries in a deviated borehole.
Figure 3:
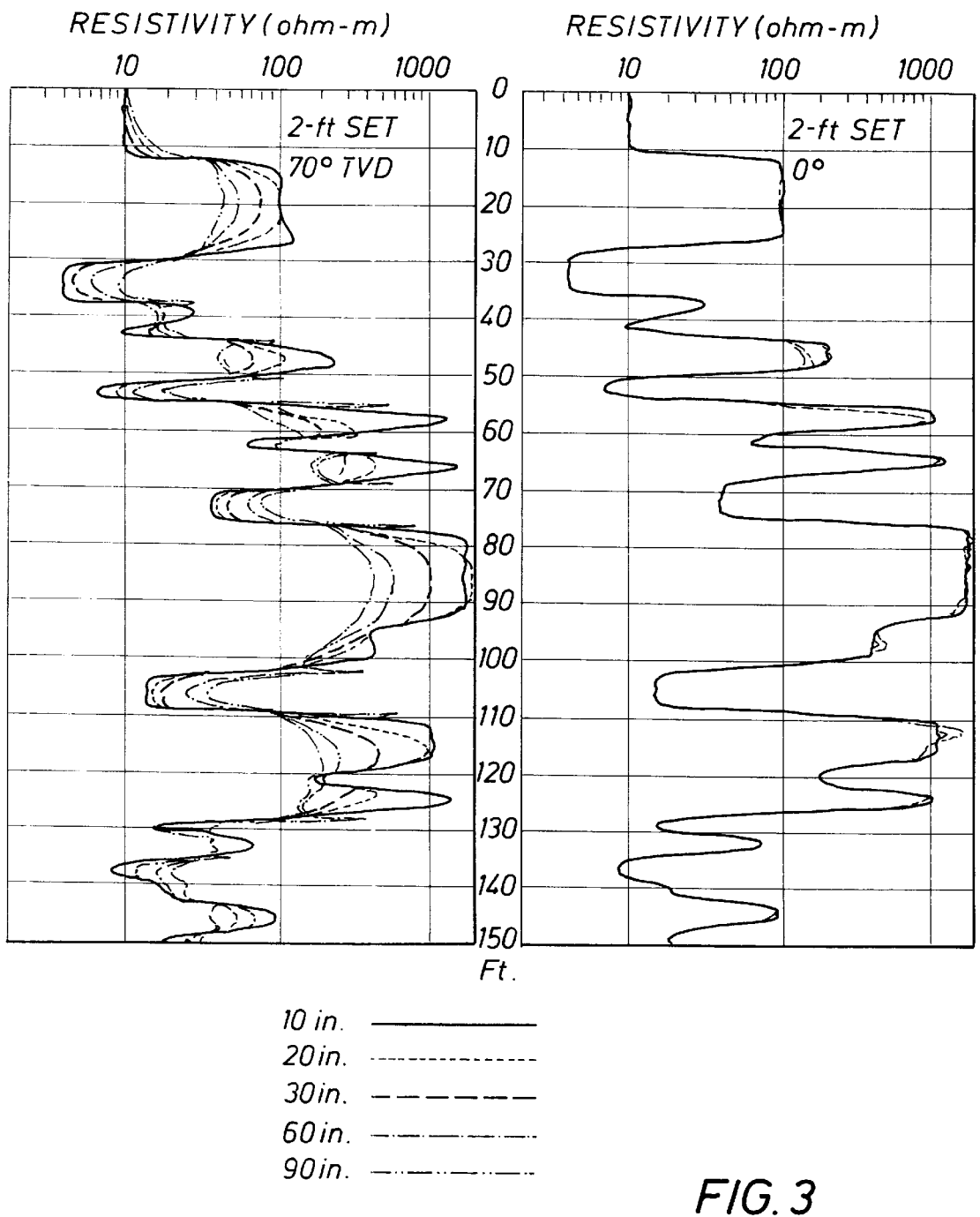
FIG. 3 shows a log at zero dip compared with a log in a borehole deviated 70°.
Figure 6:
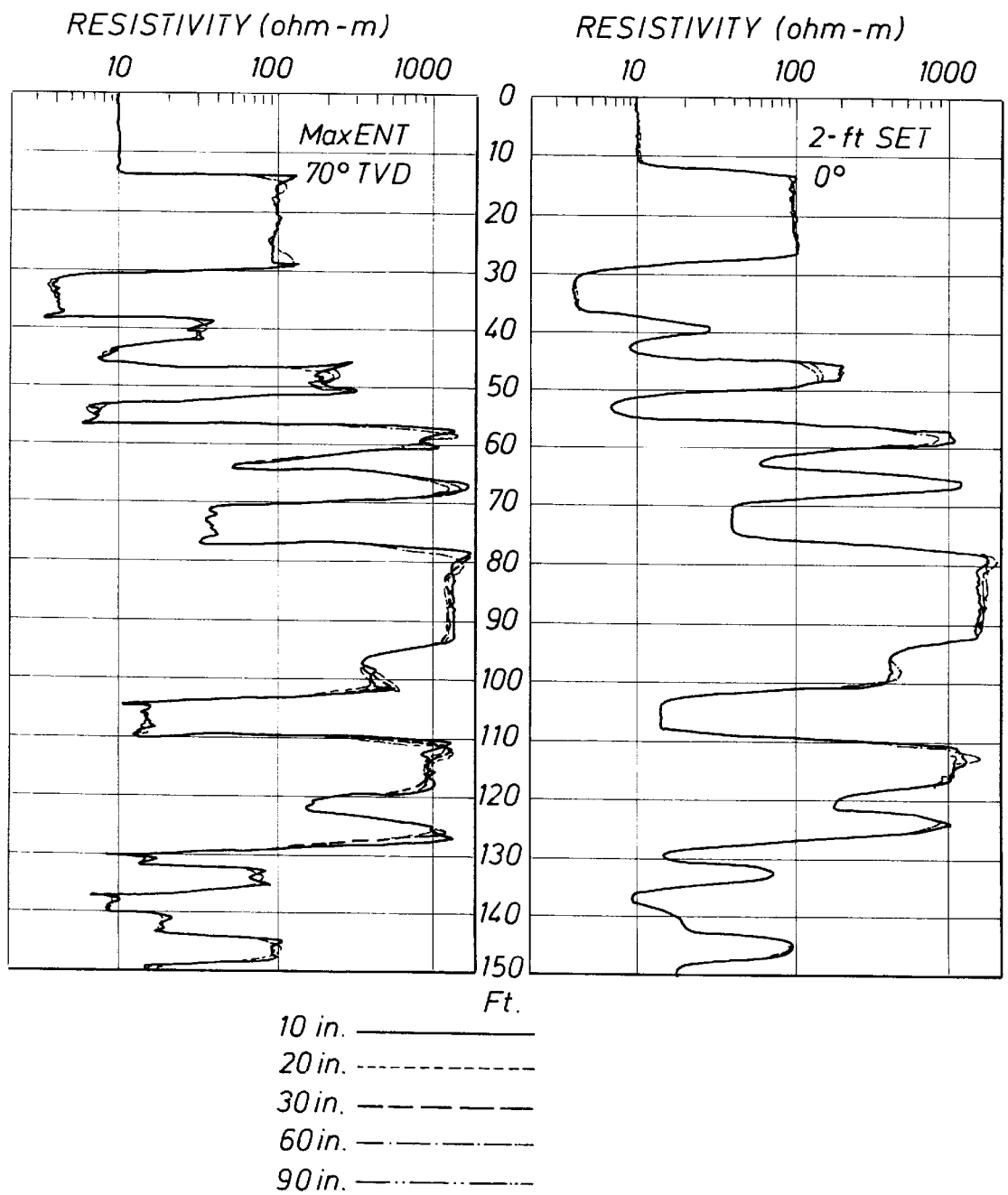
FIG. 6 shows the log of FIG. 2 processed with the maximum entropy method of FIG. 5.

As previously described in this section, FIG. 3 shows a computed array induction log in a formation. The log on the right is computed at 0° dip and the log on the left, which shows a blending of adjacent layers, is computed at 70° dip. FIG. 6 represents the same modeled formation as depicted in FIG. 3 at 0° dip and at 70° dip after applying the subject invention to the data. Application of the subject invention to the induction data graphically depicts the conductivity of each distinct layer and effectively removes the distortions produced by dip and shoulder bed.

Figure 7:
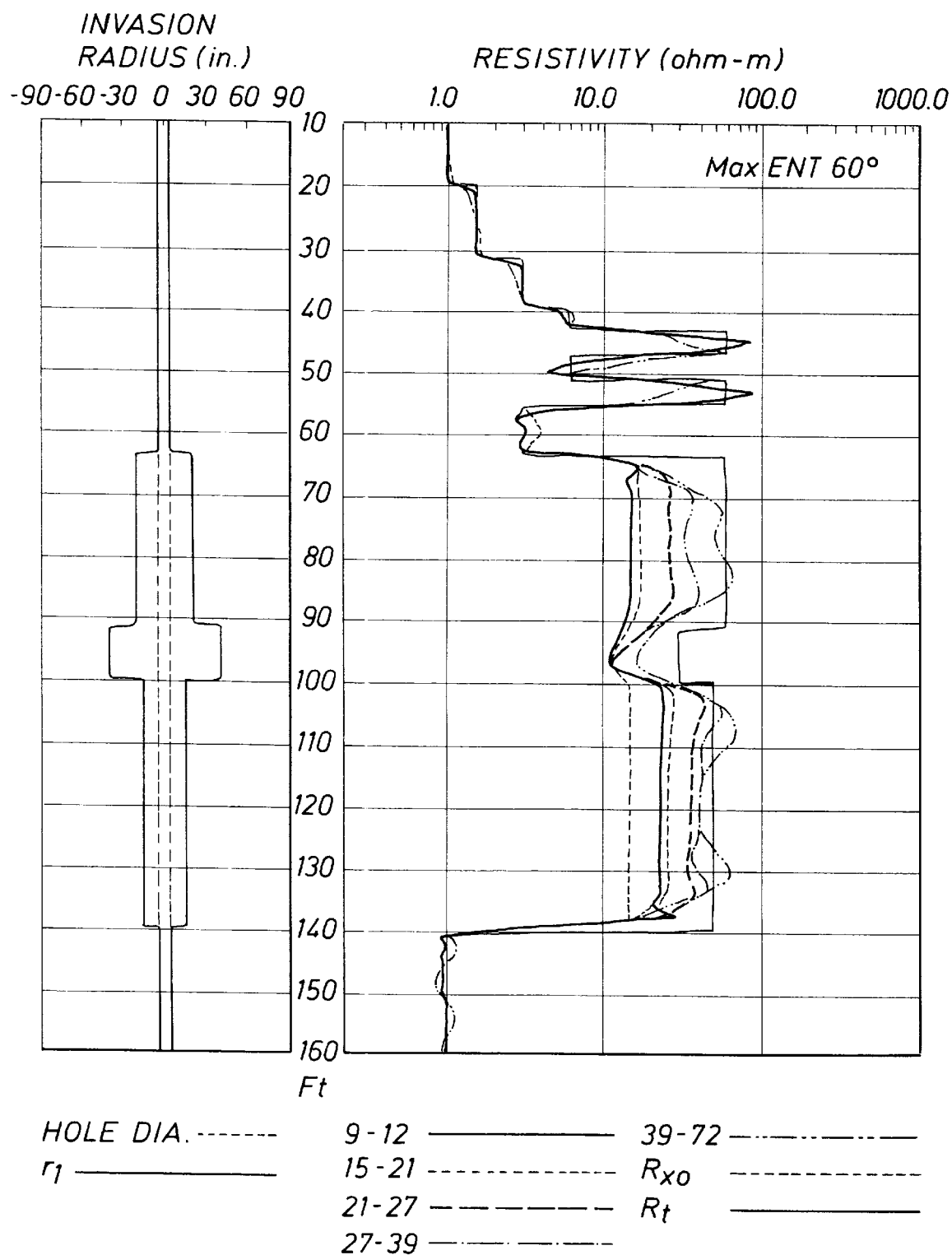
FIG. 7 shows a log of an invaded formation at 60° dip processed with the maximum entropy method of FIG. 5.
Figure 8:
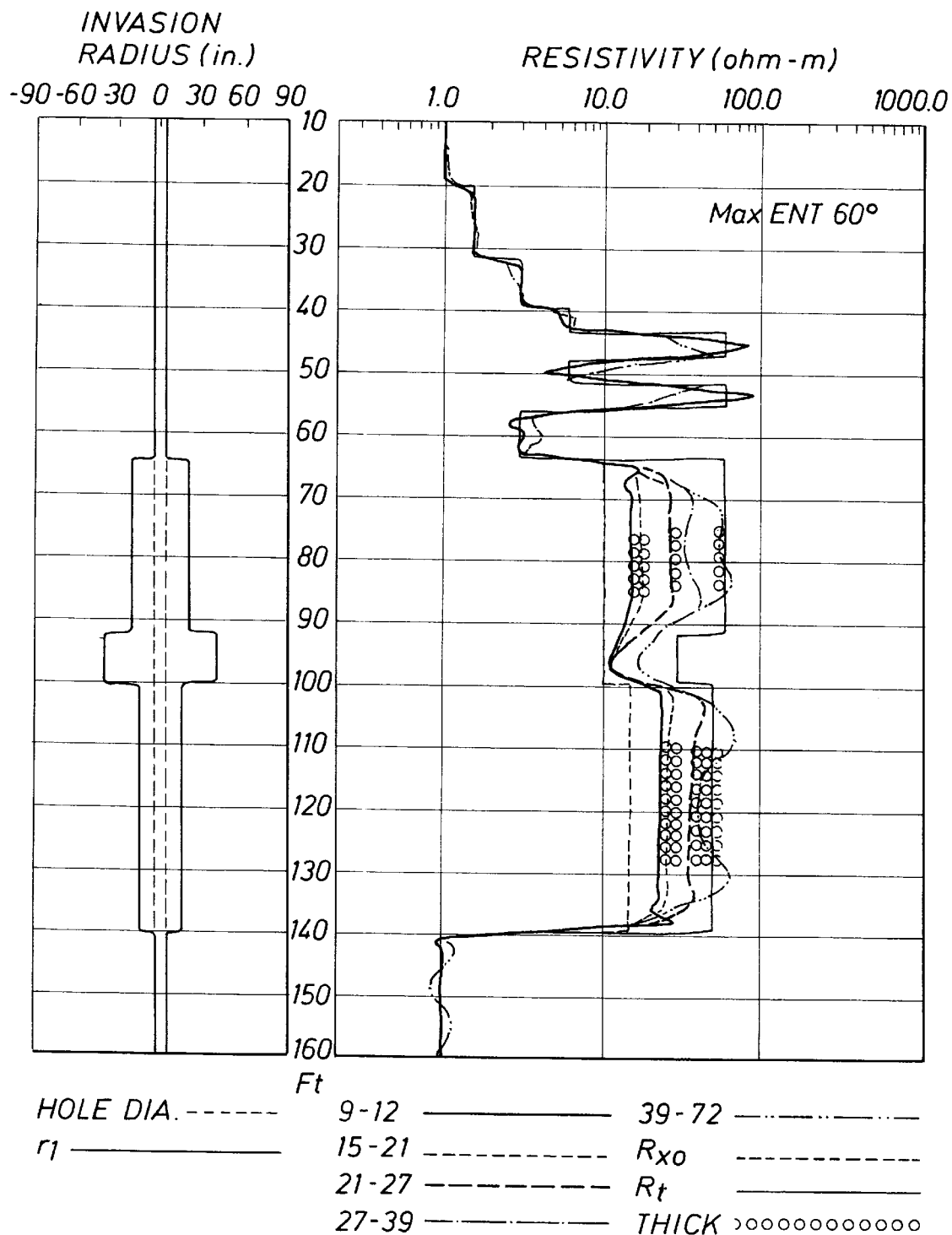
FIG. 8 overlaps data provided by the subset of arrays in thick beds of vertical wells with the same invasion profile as a well at 60° dip.
Figure 9:
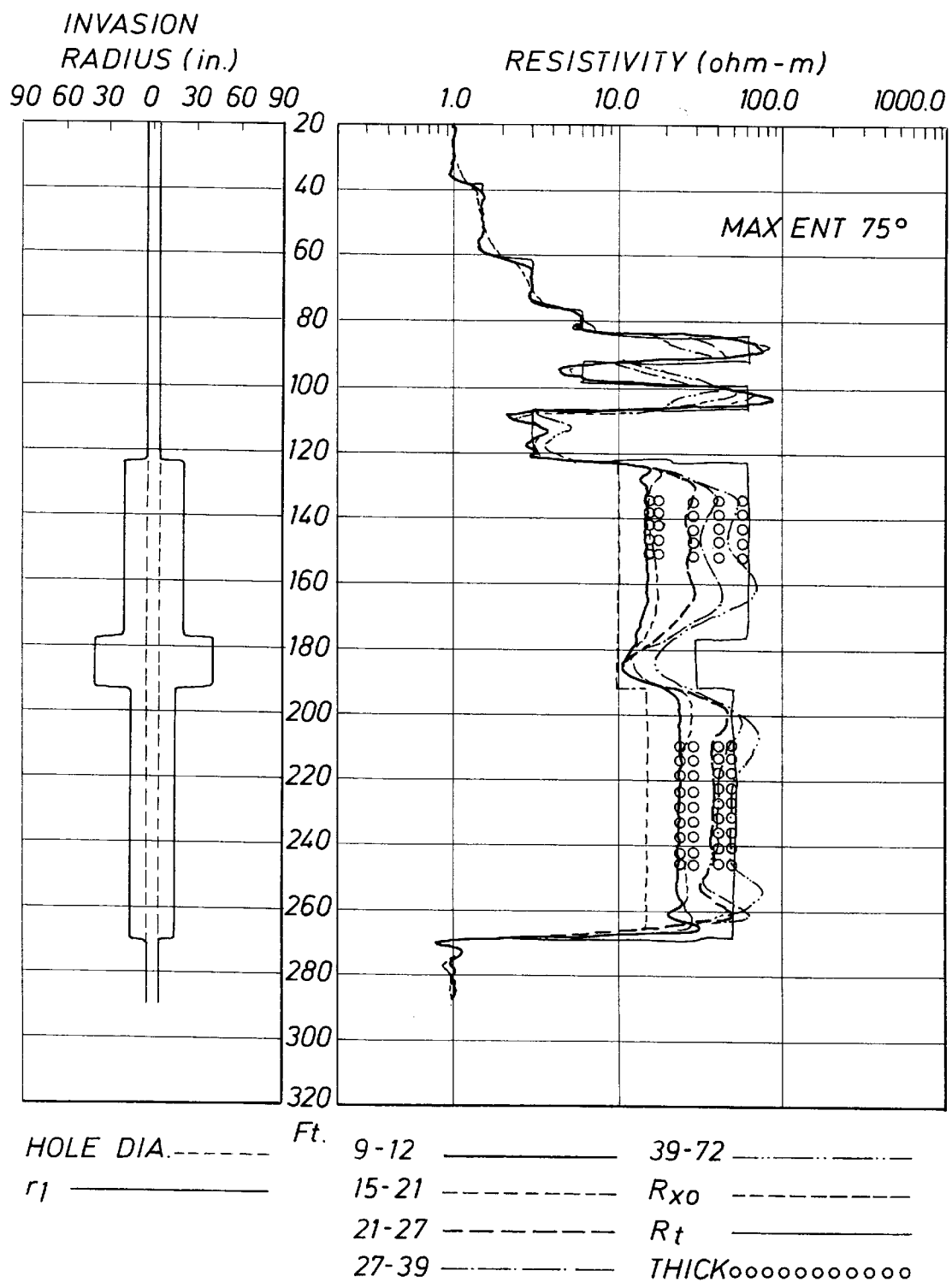
FIG. 9 overlaps data provided by the subset of arrays in thick beds of vertical wells with the same invasion profile as a well at 75° dip.
Figure 10:
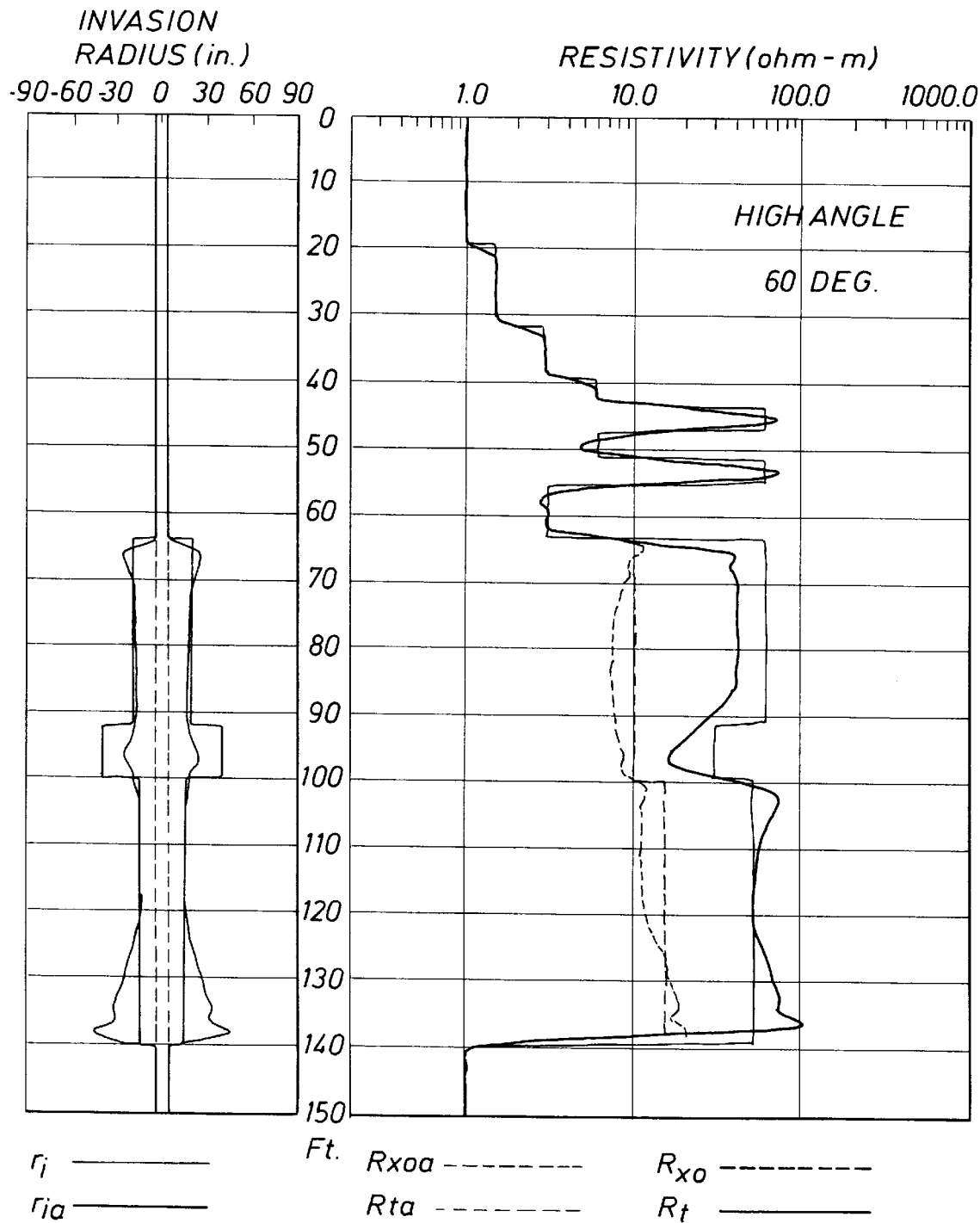
FIG. 10 diagrammatically illustrates an estimate of formation parameters $R_{xo}$, $R_t$, and the invasion radius in the formation of FIG. 7 after application of maximum entropy processing followed by 1D radial processing; and, FIG. 11 is a flow chart illustrating a dip correction method for evaluating the resistivity of invaded formations at high apparent dip angle.

Referring to FIG. 7, if invasion is present, the maximum entropy logs will spread out. The maximum entropy method inversion, as applied to an invaded formation in accordance with the subject invention, results in resistivity logs whereby a subset of shallow arrays provide a resistivity reading closer to $R_{xo}$ and a subset of deeper arrays provide a resistivity reading closer to $R_t$. Referring to FIGS. 8 and 9, the resistivity profile of a modeled invaded formation at 60° and 75° dip, respectively, is substantially identical to that provided by the subset of arrays in thick beds of vertical wells with the same invasion profile. These figures illustrate an advantageous means for obtaining the true resistivity of a formation at high dip angle in the presence of invasion. The algorithm of the subject invention is robust when there is invasion of drilling fluids into the formation and the borehole is deviated or the beds dip with respect to the borehole. The results of the maximum entropy method inversion, as applied to an invaded formation in accordance with the subject invention, are still not corrected for invasion. Since the maximum entropy inverted array pair data have a definite depth of investigation, as illustrated in FIG. 8, a 1D radial inversion of the resulting logs at each point in depth will give a closer estimate of the actual formation parameters, $R_{xo}$, $R_t$, and the invasion radius. Such a 1D radial inversion is described in U.S. Pat. No. 5,355,088 issued to Allen Q. Howard, Jr., the disclosure of which is incorporated by reference into this specification. FIG. 10 shows the results of applying the sequential processes of maximum entropy inversion followed by 1D radial inversion to the array induction log data of FIG. 7.

In an alternate embodiment of the invention, signals from a subset of coils 12, 16, 20, 28, 32, 36, 40, and 44 of the array are selected to probe different volumes of the formation surrounding the borehole. The method of the alternate embodiment of the invention uses the dip correction method described in U.S. Pat. No. 5,184,079 to process data from the subset of coils to effectively remove distortions produced by shoulder and dip effect in the presence of shallow, moderate, or deep invasion. The dip correction method uses an inverse filter derived from response functions that describe mathematically the response of the induction sonde as it crosses the bedding planes at an angle other than perpendicular. At a given fixed angle, this response function is unique. The inverse filter is computed to correct the distortions in the response introduced by the apparent dip angle and to return to a response that would have been obtained if the induction sonde had been disposed perpendicular to the bedding planes. The filters are derived from response functions computed after the logs have been corrected to the true bed thickness reference frame to remove the geometrical effects of a longer path through the formation when the borehole is not perpendicular to the bedding planes. Such filters are computed for angles every 10° and the correct result is obtained from interpolation between the defined filter angles. After processing the data, the resulting multi-array induction log will indicate a conductivity profile for the subset of coils which is substantially identical to that of an array in a thick bed, without dip or layering, with the same invasion profile.

Figure 11:
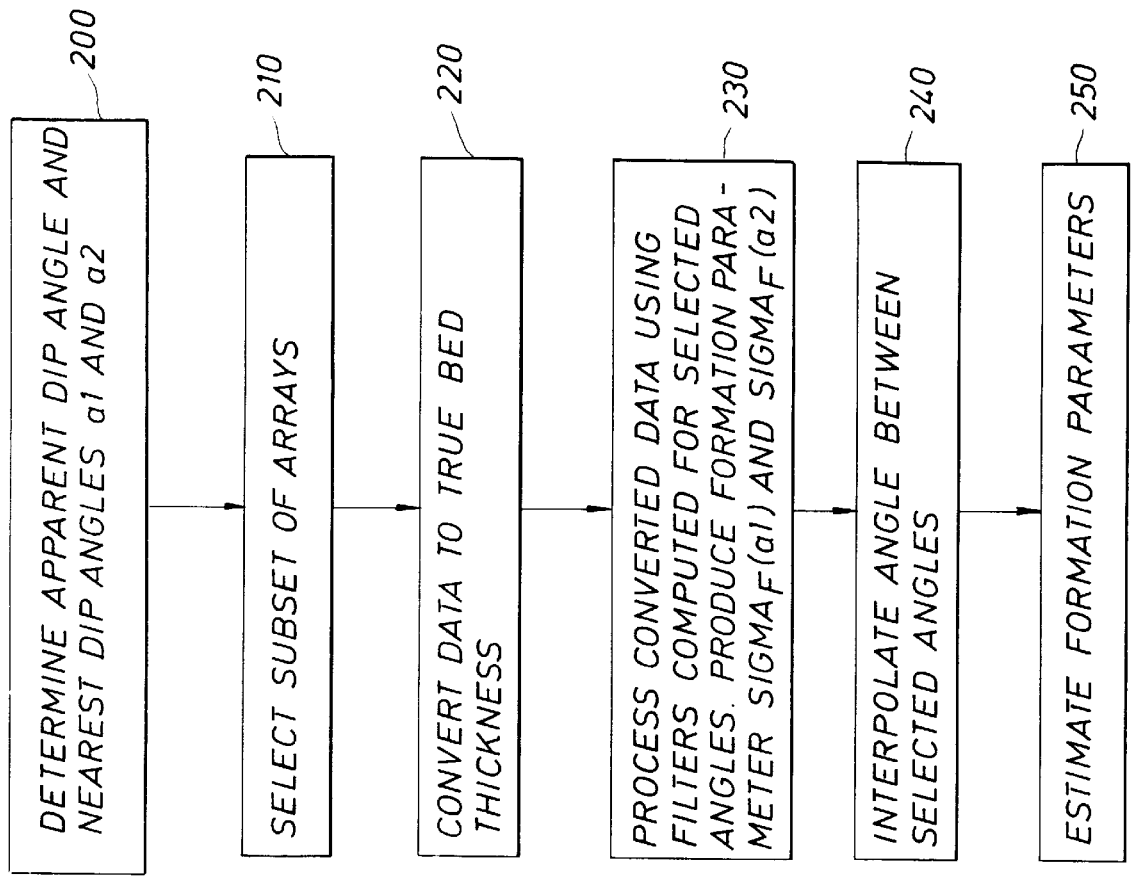

Referring to FIG. 11, a flowchart of an alternate method for evaluating the resistivity of invaded formations at high apparent dip angle is illustrated. At step 200, the apparent dip angle and two nearest defined dip angles, a1 and a2, are determined. At step 210, a subset of arrays from the multi-array induction sonde 10 are selected to identify the conductivity profile. The subset of arrays comprises any combination of two or more arrays. The combination provides better thin bed resolution and depth of investigation than processing each array singly. At step 220, the data for the subset of arrays is converted to True Bed Thickness (TBT) format and processed to remove the geometric distortion. At step 230, process the converted data for the subset of arrays with two filters h(a1) and h(a2) where h(a1) is a function of one of the two nearest defined dip angles of step 200 and filter h(a2) is a function of the other of the two nearest defined dip angles of step 200 to produce two formation parameters, sigma$_F$(a1) and sigma$_F$(a2), associated with a formation traversed by a borehole at the nearest defined dip angles. At step 240, interpolate to determine a value for sigma$_F$ based on the two nearest defined dip angles of step 200, the two formation parameters sigma$_F$(a1) and sigma$_F$(a2) of step 230, and the apparent dip angle determined in step 200. At step 250, an estimate of the formation parameters $R_{xo}$, $R_t$, and the invasion radius are determined.

The foregoing description of the preferred and alternate embodiments of the present invention have been presented for purposes of illustration and description. It is not intended to be exhaustive or limit the invention to the precise form disclosed. Obviously, many modifications and variations will be apparent to those skilled in the art. The embodiments were chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

What I claim is:

1. A method for evaluating the resistivity of invaded formations at high apparent dip angle utilizing voltage signal data from an induction tool disposed in a borehole, the tool having a plurality of arrays, wherein the borehole traverses a formation which includes a plurality of bedding planes, the method comprising the steps of:

a) selecting a subset of arrays from the plurality of arrays;

b) obtaining voltage signal data from the subset of arrays;

c) repeatedly determining an initial estimate of a conductivity profile of the formation from the data obtained in step (b) and producing a plurality of initial estimates of the conductivity profile;

d) determining model voltages associated with each of the initial estimates of the conductivity profile;

e) updating each of the initial estimates of the conductivity profile using the respective incremental values determined during the determining step (d) to perform the updating step and producing a plurality of updated conductivity profiles;

f) testing to determine which one of the plurality of updated conductivity profiles, when compared with the respective plurality of initial estimates of the conductivity profiles, satisfies a convergence test criteria, the one updated conductivity profile which satisfies the convergence test criteria being the desired updated conductivity profile;

g) recording the desired updated conductivity profile on an output record medium; and, h) determining the radial depth of investigation into the formation based upon the selected subset of arrays.

2. The method of claim 1 wherein step (a) further comprises selecting a plurality of adjacent arrays having different depths of investigation into the formation.

3. The method of claim 1 wherein the radial depth of investigation into the formation is approximately equal to the radial depth of investigation of the single array in the subset of arrays having the deepest depth of investigation.

4. The method of claim 2 wherein the radial depth of investigation into the formation is approximately equal to the radial depth of investigation of the single array in the subset of arrays having the deepest depth of investigation.

5. A method for evaluating the resistivity of invaded formations at high apparent dip angle utilizing voltage signal data from an induction tool disposed in a borehole, the tool having a plurality of arrays, wherein the borehole traverses a formation which includes a plurality of bedding planes, the method comprising the steps of:

a) selecting a subset of arrays from the plurality of arrays;

b) obtaining voltage signal data from the subset of arrays;

c) repeatedly determining an initial estimate of a conductivity profile of the formation from the data obtained in step (b) and producing a plurality of initial estimates of the conductivity profile;

d) determining model voltages associated with each of the initial estimates of the conductivity profile;

e) updating each of the initial estimates of the conductivity profile using the respective incremental values determined during the determining step (d) to perform the updating step and producing a plurality of updated conductivity profiles;

f) testing to determine which one of the plurality of updated conductivity profiles, when compared with the respective plurality of initial estimates of the conductivity profiles, satisfies a convergence test criteria, the one updated conductivity profile which satisfies the convergence test criteria being the desired updated conductivity profile;

g) recording the desired updated conductivity profile on an output record medium; and, h) estimating a formation parameter.

6. The method of claim 5 further comprising the step of matching the vertical resolution of shallow and deep array data provided by the subset of arrays.

7. The method of claim 6 further comprising the step of weighting the vertically resolved data to derive the depth of investigation into the formation.

8. A method for evaluating the resistivity of invaded formations at high apparent dip angle utilizing voltage signal data from an induction tool disposed in a borehole, the tool having a plurality of arrays, wherein the borehole traverses a formation which includes a plurality of bedding planes, the method comprising the steps of:

a) determining an apparent dip angle representing an angle between a longitudinal axis of the borehole and an axis perpendicular to the bedding planes;

b) selecting a subset of arrays from the plurality of arrays;

c) obtaining voltage signal data from the subset of arrays;

d) converting the data obtained in step (c) to true bed thickness (TBT) format thereby producing TBT converted data;

e) processing and correcting the TBT converted data to reduce shoulder bed effects at approximately zero dip angle thereby producing processed, converted data;

f) determining two filters h(a1) and h(a2) as a function of two angles a1 and a2, where the two angles are related to the apparent dip angle as follows, a1<the apparent dip angle<a2, the two filters h(a1) and h(a2) each being determined as a function of their angles a1 and a2 in accordance with the following expression, $$\int_{-\infty}^{\infty} h(z-z')g(z')dz' = \delta(z-z')$$

where $\delta(z-z')$ is the Dirac delta function and g(z) is determined in accordance with the following expression, $$g(z) = a\frac{d\sigma_m}{dz};$$

g) determining two values, $\sigma_F(a1)$ and $\sigma_F(a2)$, as a function of the two filters h(a1) and h(a2), respectively, and as a function of the processed converted data of step (e) in accordance with the following expression, where the two values are parameters representing the conductivity profile data at angles a1 and a2, $$\sigma_F(j) = \sum_{n=-(N-1)/2}^{(N-1)/2} h_a(n)\sigma(j-n);$$

h) interpolating to determine a value, $\sigma_F$, as a function of the apparent dip angle representing a parameter of the formation at the apparent dip angle using the two values of step (g), the two angles, and the apparent dip angle of step (f), the value, $\sigma_F$, being the output signal, and, i) determining the radial depth of investigation into the formation based upon the selected subset of arrays.

9. The method of claim 8 wherein step (b) further comprises selecting a plurality of adjacent arrays having different depths of investigation into the formation.

10. The method of claim 8 wherein the radial depth of investigation into the formation is approximately equal to the radial depth of investigation of the single array in the subset of arrays having the deepest depth of investigation.

11. The method of claim 9 wherein the radial depth of investigation into the formation is approximately equal to the radial depth of investigation of the single array in the subset of arrays having the deepest depth of investigation.

12. A method for evaluating the resistivity of invaded formations at high apparent dip angle utilizing voltage signal data from an induction tool disposed in a borehole, the tool having a plurality of arrays, wherein the borehole traverses a formation which includes a plurality of bedding planes, the method comprising the steps of:

a) determining an apparent dip angle representing an angle between a longitudinal axis of the borehole and an axis perpendicular to the bedding planes;

b) selecting a subset of arrays from the plurality of arrays;

c) obtaining voltage signal data from the subset of arrays;

d) converting the data obtained in step (c) to true bed thickness (TBT) format thereby producing TBT converted data;

e) processing and correcting the TBT converted data to reduce shoulder bed effects at approximately zero dip angle thereby producing processed, converted data;

f) determining two filters h(a1) and h(a2) as a function of two angles a1 and a2, where the two angles are related to the apparent dip angle as follows, a1<the apparent dip angle<a2, the two filters h(a1) and h(a2) each being determined as a function of their angles a1 and a2 in accordance with the following expression, $$\int_{-\infty}^{\infty} h(z-z')g(z')dz' = \delta(z-z')$$

where $\delta(z-z')$ is the Dirac delta function and g(z) is determined in accordance with the following expression, $$g(z) = a\frac{d\sigma_m}{dz};$$

g) determining two values, $\sigma_F(a1)$ and $\sigma_F(a2)$, as a function of the two filters h(a1) and h(a2), respectively, and as a function of the processed converted data of step (e) in accordance with the following expression, where the two values are parameters representing the conductivity profile data at angles a1 and a2, $$\sigma_F(j) = \sum_{n=-(N-1)/2}^{(N-1)/2} h_a(n)\sigma(j-n);$$

h) interpolating to determine a value, sigma$_F$, as a function of the apparent dip angle representing a parameter of the formation at the apparent dip angle using the two values of step (g), the two angles, and the apparent dip angle of step (f), the value, sigma$_F$, being the output signal, and, i) estimating a formation parameter.

13. The method of claim 12 further comprising the step of matching the vertical resolution of shallow and deep array data provided by the subset of arrays.

14. The method of claim 13 further comprising the step of weighting the vertically resolved data to derive the depth of investigation into the formation.

15. An apparatus for evaluating the resistivity of invaded formations at high apparent dip angle utilizing voltage signal data from an induction tool disposed in a borehole, the tool having a plurality of arrays, wherein the borehole traverses a formation which includes a plurality of bedding planes, comprising:

a) means for selecting a subset of arrays from the plurality of arrays;

b) means for obtaining voltage signal data from the subset of arrays;

c) means for repeatedly determining an initial estimate of the conductivity profile of the formation from the data obtained in step (b) and means for producing a plurality of initial estimates of the conductivity profile;

d) means for determining model voltages associated with each of the initial estimates of the conductivity profile;

e) means for updating each of the initial estimates of the conductivity profile using the respective incremental values determined during the determining step (d) to perform the updating step and means for producing a plurality of updated conductivity profiles;

f) means for testing to determine which one of the plurality of updated conductivity profiles, when compared with the respective plurality of initial estimates of the conductivity profiles, satisfies a convergence test criteria, the one updated conductivity profile which satisfies the convergence test criteria being the desired updated conductivity profile;

g) means for recording the desired updated conductivity profile on an output record medium; and, h) means for determining the radial depth of investigation into the formation based upon the selected subset of arrays.

16. The apparatus of claim 15 wherein the means for selecting a subset of arrays from the plurality of arrays further comprises means for selecting a plurality of adjacent arrays having different depths of investigation into the formation.

17. The apparatus of claim 15 wherein the radial depth of investigation into the formation is approximately equal to the radial depth of investigation of the single array in the subset of arrays having the deepest depth of investigation.

18. The apparatus of claim 16 wherein the radial depth of investigation into the formation is approximately equal to the radial depth of investigation of the single array in the subset of arrays having the deepest depth of investigation.

19. An apparatus for evaluating the resistivity of invaded formations at high apparent dip angle utilizing voltage signal data from an induction tool disposed in a borehole, the tool having a plurality of arrays, wherein the borehole traverses a formation which includes a plurality of bedding planes, comprising:

a) means for selecting a subset of arrays from the plurality of arrays;

b) means for obtaining voltage signal data from the subset of arrays;

c) means for repeatedly determining an initial estimate of the conductivity profile of the formation from the data obtained in step (b) and means for producing a plurality of initial estimates of the conductivity profile;

d) means for determining model voltages associated with each of the initial estimates of the conductivity profile;

e) means for updating each of the initial estimates of the conductivity profile using the respective incremental values determined during the determining step (d) to perform the updating step and means for producing a plurality of updated conductivity profiles;

f) means for testing to determine which one of the plurality of updated conductivity profiles, when compared with the respective plurality of initial estimates of the conductivity profiles, satisfies a convergence test criteria, the one updated conductivity profile which satisfies the convergence test criteria being the desired updated conductivity profile;

g) means for recording the desired updated conductivity profile on an output record medium; and, h) means for estimating a formation parameter.

20. The apparatus of claim 19 further comprising means for matching the vertical resolution of shallow and deep array data provided by the subset of arrays.

21. The apparatus of claim 20 further comprising means for weighting the vertically resolved data to derive the depth of investigation into the formation.

22. An apparatus for evaluating the resistivity of invaded formations at high apparent dip angle utilizing voltage signal data from an induction tool disposed in a borehole, the tool having a plurality of arrays, wherein the borehole traverses a formation which includes a plurality of bedding planes, comprising:

a) means for determining an apparent dip angle representing an angle between a longitudinal axis of the deviated borehole and an axis perpendicular to the bedding planes;

b) means for selecting a subset of arrays from the plurality of arrays;

c) means for obtaining voltage signal data from the subset of arrays;

d) means for converting the data obtained in step (c) to true bed thickness (TBT) format thereby producing TBT converted data;

e) means for processing and correcting the TBT converted data to reduce shoulder bed effects at approximately zero dip angle thereby producing processed, converted data;

f) means for determining two filters h(a1) and h(a2) as a function of two angles a1 and a2, where the two angles are related to the apparent dip angle as follows, a1<the apparent dip angle<a2, the two filters h(a1) and h(a2) each being determined as a function of their angles a1 and a2 in accordance with the following expression, $$\int_{-\infty}^{\infty} h(z-z')g(z')dz' = \delta(z-z')$$

where $\delta(z-z')$ is the Dirac delta function and $g(z)$ is determined in accordance with the following expression, $$g(z) = a\frac{d\sigma_m}{dz};$$

g) means for determining two values, sigma$_F$(a1) and sigma$_F$(a2), as a function of the two filters h(a1) and h(a2), respectively, and as a function of the processed converted data of step (e) in accordance with the following expression, where the two values are parameters representing the conductivity profile data at angles a1 and a2, $$\sigma_F(j) = \sum_{n=-(N-1)/2}^{(N-1)/2} h_a(n)\sigma(j-n);$$

h) means for interpolating to determine a value, sigma$_F$, as a function of the apparent dip angle representing a parameter of the formation at the apparent dip angle using the two values of step (g), the two angles, and the apparent dip angle of step (f), the value, sigma$_F$, being the output signal, and, i) means for determining the radial depth of investigation into the formation based upon the selected subset of arrays.

23. The apparatus of claim 22 wherein the means for selecting a subset of arrays from the plurality of arrays further comprises means for selecting a plurality of adjacent arrays having different depths of investigation into the formation.

24. The apparatus of claim 22 wherein the radial depth of investigation into the formation is approximately equal to the radial depth of investigation of the single array in the subset of arrays having the deepest depth of investigation.

25. The apparatus of claim 23 wherein the radial depth of investigation into the formation is approximately equal to the radial depth of investigation of the single array in the subset of arrays having the deepest depth of investigation.

26. An apparatus for evaluating the resistivity of invaded formations at high apparent dip angle utilizing voltage signal data from an induction tool disposed in a borehole, the tool having a plurality of arrays, wherein the borehole traverses a formation which includes a plurality of bedding planes, comprising:

a) means for determining an apparent dip angle representing an angle between a longitudinal axis of the deviated borehole and an axis perpendicular to the bedding planes;

b) means for selecting a subset of arrays from the plurality of arrays;

c) means for obtaining voltage signal data from the subset of arrays;

d) means for converting the data obtained in step (c) to true bed thickness (TBT) format thereby producing TBT converted data;

e) means for processing and correcting the TBT converted data to reduce shoulder bed effects at approximately zero dip angle thereby producing processed, converted data;

f) means for determining two filters h(a1) and h(a2) as a function of two angles a1 and a2, where the two angles are related to the apparent dip angle as follows, a1<the apparent dip angle<a2, the two filters h(a1) and h(a2) each being determined as a function of their angles a1 and a2 in accordance with the following expression, $$\int_{-\infty}^{\infty} h(z-z')g(z')dz' = \delta(z-z')$$

where $\delta(z-z')$ is the Dirac delta function and $g(z)$ is determined in accordance with the following expression, $$g(z) = a\frac{d\sigma_m}{dz};$$

g) means for determining two values, sigma$_F$(a1) and sigma$_F$(a2), as a function of the two filters h(a1) and h(a2), respectively, and as a function of the processed converted data of step (e) in accordance with the following expression, where the two values are parameters representing the conductivity profile data at angles a1 and a2, $$\sigma_F(j) = \sum_{n=-(N-1)/2}^{(N-1)/2} h_a(n)\sigma(j-n);$$

h) means for interpolating to determine a value, sigma$_F$, as a function of the apparent dip angle representing a parameter of the formation at the apparent dip angle using the two values of step (g), the two angles, and the apparent dip angle of step (f), the value, sigma$_F$, being the output signal, and, i) means for estimating a formation parameter.

27. The apparatus of claim 26 further comprising means for matching the vertical resolution of shallow and deep array data provided by the subset of arrays.

28. The apparatus of claim 27 further comprising means for weighting the vertically resolved data to derive the depth of investigation into the formation.

29. The method of claim 1 wherein step (d) comprises calculating a response of the induction tool in a model formation consisting of a series of thin layers with dip.

30. The method of claim 5 wherein step (d) comprises calculaing a repsonse of the induction tool in a model formation consisting of a series of thin layers with dip.

31. The apparatus of claim 15, wherein the means for determining model voltages associated with each of the initial estimates of the conductivity profile further comprises means for calculating a response of the induction tool in a model formation consisting of a series of thin layers with dip.

32. The apparatus of claim 19 wherein the means for determining model voltages associated with each of the initial estimates of the conductivity profile further comprises means for calculating a response of the induction tool in a model formation consisting of a series of thin layers with dip.

* * * * *